Figure 1:
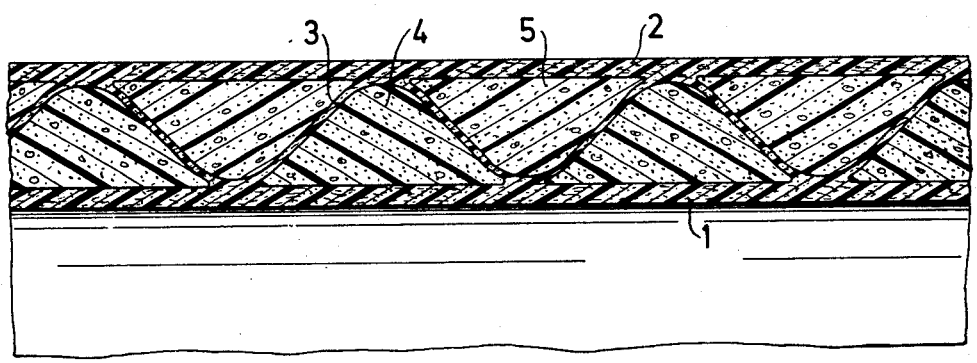

United States Patent [19]

Borge

[11] 3,967,650
[45] July 6, 1976

[54] PIPES
[75] Inventor: Kjell S. Borge, Stokke, Norway
[73] Assignee: Vera Fabrikker A/S, Sandefjord, Norway
[22] Filed: Nov. 29, 1973
[21] Appl. No.: 420,094

[30] Foreign Application Priority Data
Dec. 5, 1972 Norway.............................. 4460/72

[52] U.S. Cl.............................. 138/144; 138/173
[51] Int. Cl.² ........................ F16L 9/06; F16L 9/16
[58] Field of Search ............ 138/153, 149, 173, 144

[56] References Cited
UNITED STATES PATENTS

| | | | |
|---|---|---|---|
| 2,409,249 | 10/1946 | Brown................................. | 138/144 |
| 2,877,150 | 10/1959 | Wilson................................ | 138/144 |
| 3,532,132 | 10/1970 | Rubenstein........................ | 138/172 |
| 3,677,303 | 7/1972 | Martin................................. | 138/149 |

FOREIGN PATENTS OR APPLICATIONS
1,256,002   12/1967   Germany ........................... 138/153

Primary Examiner—Richard C. Queisser
Assistant Examiner—Anthony V. Ciarlante
Attorney, Agent, or Firm—Cushman, Darby & Cushman

[57] ABSTRACT

A pipe of fiber reinforced thermoplastic material is provided wherein the wall consists of at least one layer having two coaxial cylindrical shells between which a corrugated layer is disposed. The outwardly facing wave peaks of the corrugated layer are anchored to the inside of the outer shell and the inwardly facing wave peaks are anchored to the outside of the inner shell. The spaces between the corrugated layer and the outer layer and inner shell, respectively, are filled with a suitable material, preferably foam plastic material.

3 Claims, 3 Drawing Figures

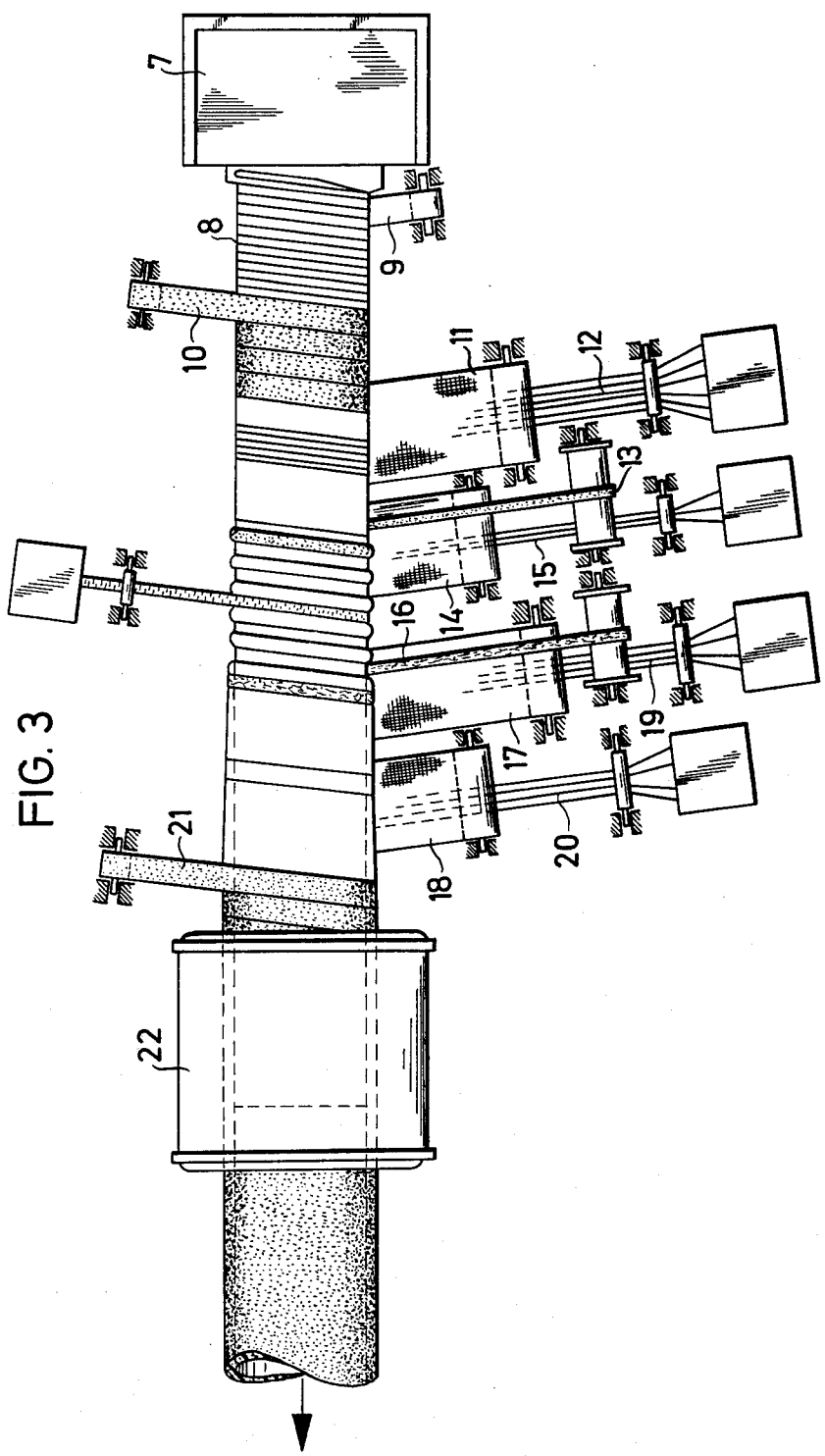

PIPES

The present invention relates to an improvement in pipes of fibre-reinforced thermoplastic material.

Pipes of fibre reinforced thermoplastic material, particularly glass-fibre reinforced polyester have become widely used as sewage pipes. This is due to the number of advantages obtained with pipes of this material, for example, they are acid resistant and can therefore be used as sewage pipes for aggressive liquids from industrial operations and the like. A substantial advantage in regard to pipes of fibre-reinforced thermoplastic material is that they can be formed with joints that are completely sealed. Furthermore, the pipes are lightweight which means inexpensive transport and mounting at the work location. The material is extremely expensive, however, and in order to obtain adequate annular rigidity in the pipe and tolerance of bending factors in annular direction, such pipes have hitherto been produced with ribs on the exterior thereof. The said ribs increase, to a certain degree, the annular rigidity. In certain circumstances, however, such a reinforcement is inadequate, particularly in regard to pipes which are to be buried and the construction allows a relatively poor distribution of tension with respect to the annular cross-section. The construction with annular or helically shaped ribs produces a pipe which has little axial strength, moreover, and such pipes are not particularly well adapted to withstand shear strains.

The object of the invention is therefore to provide a pipe of fibre-reinforced thermoplastic material of great annular rigidity, which can tolerate bending factors in annular direction, good tension distribution throughout the annular cross-section, great axial strength and the capability of withstanding relatively great shear forces, and that in construction of the pipe only small amounts of glass fibre reinforcement are included with respect to the thickness of the pipe wall.

In accordance with the invention, this is achieved by an improvement in a pipe of fibre-reinforced thermoplastic material which is characterized in that the pipe wall consists of at least one layer constituted by two coaxial, cylindrical shells, between which a corrugated layer is disposed, the outwardly facing curves being anchored to the interior of the outer shell and the inwardly facing curves being anchored to the exterior of the inner shell and the space between the corrugated layer and the outer and inner shell respectively is filled with a suitable reinforcing material.

In an embodiment according to the invention, the pipe walls consist of two layers, the outer shell of the inner layer forming at the same time the inner shell of the outer layer. The intermediate space between the corrugated layer or layers respectively and the cylindrical shell may be filled with foam plastic material, particularly in the form of strips of foam plastic material. A further possibility is to fill the said space with sand mixed polyester enclosed in a stocking or hose of suitable material.

The pipe according to the invention may be constructed such that the cylindrical shells and the corrugated layers consist of fibre-reinforced thermoplastic material. A further embodiment is that the cylindrical layers consist of fibre-reinforced thermoplastic material, the corrugated layer or layers, respectively, consisting of a premanufactured section, for example, a flanged U-section of plastic material.

A further object of the invention is to provide a method of producing pipes of the above said type, the said method being characterized in that a layer of fibre-reinforced thermoplastic material is applied to a rotating mandrel and that foam plastic strips or a stocking or hose filled with sand or other suitable granular material, preferably with added binder, are helically wound onto the first said layer, a further layer of reinforced thermoplastic material is thereafter applied the last said layer following the contours of the first said layer and the helically wound strip or stocking, in that the depressions of the corrugations are then filled with a strip of foam plastic or a sand-filled stocking, and that a cylindrical layer of fibre-reinforced thermoplastic material is thereafter applied which is joined to the peaks of the corrugated material and the strips disposed in the depressions thereof.

Figure 2:
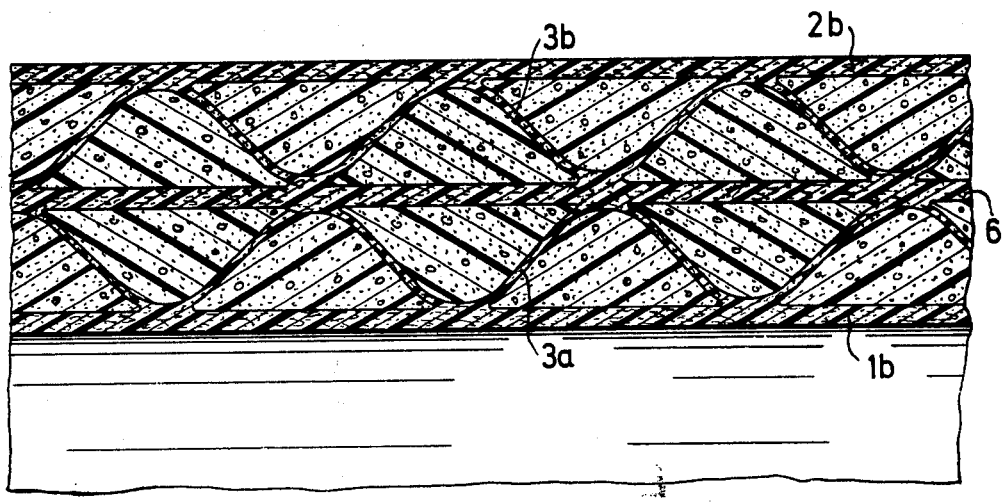

The invention is further explained in the following with reference to the drawing which in FIGS. 1 and 2 show two examples of the pipes according to the invention, illustrated as a section through a part of the pipe wall.

FIG. 3 is a view of an apparatus for construction of pipes according to the invention.

The pipe wall in FIG. 1 has a layer consisting of an inner cylindrical shell 1 and, relative to the said shell 1, an outer, coaxial, cylindrical shell 2. Between the two shells 1 and 2, a corrugated layer 3 is provided and, in the intermediate spaces 4 and 5 between the corrugated layer and the inner and outer layer, respectively, foam plastic or other suitable filler material is disposed. The said filler material can, for example, be sand bonded by polyester, or ordinary cement.

FIG. 2 is a view of a section through a part of a pipe wall having two layers, where the inner shell of the inner layer is signified by 1b and the outer shell of the outer layer by 2b. A central cylindrical shell 6 constitutes the outer shell of the inner layer and the inner shell of the outer layer. A corrugated layer 3a is arranged between the inner shell 1b and the central layer 6 and a corrugated layer 3b is arranged between the central layer 6 and the outer shell 2b. As with the preceding example, the intermidiate spaces between the corrugated layers and the cylindrical shells are filled with foam plastic or other suitable filler material.

FIG. 3 is a view of an apparatus for the production of pipes according to the invention. The apparatus is a so-called Drostholm apparatus for winding of glass fibre reinforced polyester pipes and consists of a machine unit 7 which winds a steel band onto a cylindrical, rotating mandrel 8 which, as the band is wound, travels towards the left on the drawing. The steel band is wound off by the mandrel when it has reached a certain length and returns to the part 7. The band thus travels continuously and forms a continuously renewed mandrel. Onto this travelling mandrel, a layer 9 of a release film is first applied, for example, cellophane. Thereafter, a so-called surface web 10 is applied, and thereafter the first glass fibre web 11 together with the roving 12. The webs are wet with polyester prior to or at the moment they are applied to the mandrel. In this manner, a laminate of several layers of glass fibre webs is constructed. when the inner shell is sufficiently thick, a foam plastic strip 13 is helically wound onto the first layer and, on top of the foam plastic strips and the said first layer, a glass fibre web 14 and fibres 15 are applied, wound such as to be disposed between the helical threads of the strips. When this material has a sufficiently thick corrugated layer, a profile strip 16 is introduced which is helically wound in the depressions of the corrugations formed by the first strip 13. The outer layer 2 is then applied to the profile strip, said layer 2 consisting of glass fibre webs 17 and 18 and reinforcement fibres 19 and 20. A surface layer is applied to the outer layer 2 by means of a strip 21 of synthetic fibres. The construction of the pipe is then finished and the pipe passes through a hardening furnace 22. In plase of the plastic strips 13 and 16, a stocking or hose filled with granular material, bonded by, for example, polyester, can be introduced from a roll.

In accordance with the loading conditions, it is possible to vary the inlay between the corrugated layer and the cylindrical shells. It is, for example possible to obtain a pipe which is better adapted to withstand shear strains if the intermediate space between the corrugated layer and the cylindrical shells is filled with sand mixed with polyester than if the intermediate spaces were filled with foam plastic. It is also possible, for example, to fill the inner intermediate spaces with sand and the outer with foam plastic, a pipe which has good resistance to shear strains and bending strains is then obtained and this pipe is also of lighter weight than if the outer intermediate spaces also were filled with sand.

It is also possible to envisage an embodiment where the corrugated layer is constituted by a premanufactured profile, for example, a flanged U-section of plastic material. An inner shell of fibre reinforced thermoplastic material is then first constructed and the finished profile is helically wound. The profile can be already filled with, for example, foam plastic. The procedure is then as described hereinabove.

Having described my invention, I claim:

1. A pipe having a wall comprising spaced apart concentric first and second cylindrical shells of a laminate of helically wound plastic-impregnated fibers, and an intermediate layer between said first and second shells comprising two helically wound strips of filler material, the windings being spaced apart along the axis of the pipe and the convolutions of one strip lying between the convolutions of the other strip; and a helically wound layer of plastic impregnated fiber disposed between and engaging the two windings thereby forming a corrugated layer having helical corrugations, said layer being anchored to the innermost shell along a path corresponding to one of the filler strip windings and anchored to the outermost shell along a path corresponding to the other filler strip winding.

2. A pipe as in claim 1 wherein at least one of said filler strips is a strip of foam plastic material.

3. A pipe as in claim 1 wherein at least one of said filler strips is a hose filled with granular material.

* * * * *